United States Patent
Kaiser et al.

(10) Patent No.: US 10,486,393 B2
(45) Date of Patent: *Nov. 26, 2019

(54) DEVICES INCLUDING METAL LAMINATE WITH METALLURGICAL BONDS AND REDUCED-DENSITY METAL CORE LAYER

(71) Applicant: Materion Corporation, Mayfield Heights, OH (US)

(72) Inventors: Joseph G. Kaiser, Barrington, RI (US); Aaron M. Vodnick, East Greenwich, RI (US)

(73) Assignee: MATERION CORPORATION, Mayfield Heights, OH (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/873,235

(22) Filed: Jan. 17, 2018

(65) Prior Publication Data

US 2018/0134009 A1    May 17, 2018

Related U.S. Application Data

(62) Division of application No. 14/879,831, filed on Oct. 9, 2015, now Pat. No. 9,889,632.

(60) Provisional application No. 62/181,436, filed on Jun. 18, 2015, provisional application No. 62/061,824, filed on Oct. 9, 2014.

(51) Int. Cl.

| | |
|---|---|
| *C08G 63/02* | (2006.01) |
| *B32B 15/01* | (2006.01) |
| *B21B 1/22* | (2006.01) |
| *B23K 20/04* | (2006.01) |
| *B32B 3/26* | (2006.01) |
| *B32B 3/30* | (2006.01) |

(52) U.S. Cl.
CPC .............. *B32B 15/016* (2013.01); *B21B 1/22* (2013.01); *B23K 20/04* (2013.01); *B32B 3/266* (2013.01); *B32B 3/30* (2013.01); *B32B 15/01* (2013.01); *B32B 15/011* (2013.01); *B32B 15/012* (2013.01); *B32B 15/017* (2013.01); *B32B 2307/722* (2013.01)

(58) Field of Classification Search
USPC ...... 156/233, 235; 426/80, 84; 428/417, 418
See application file for complete search history.

(56) References Cited

U.S. PATENT DOCUMENTS

| | | | |
|---|---|---|---|
| 4,011,982 | A | 3/1977 | Marancik |
| 4,246,045 | A | 1/1981 | Ulam |
| 5,192,623 | A | 3/1993 | Gewelber |
| 6,002,098 | A | 12/1999 | Pircher et al. |
| 6,150,037 | A | 11/2000 | Saijo et al. |
| 6,455,172 | B1 | 9/2002 | Yano et al. |
| 7,175,919 | B2 | 2/2007 | Saijo et al. |
| 2002/0106468 | A1 | 8/2002 | Obeshaw |
| 2007/0154731 | A1 | 7/2007 | Vatchiants |
| 2010/0040902 | A1 | 2/2010 | Mizrahi |

FOREIGN PATENT DOCUMENTS

| | | |
|---|---|---|
| JP | 2003294032 | 10/2003 |
| JP | 2004028483 | 1/2004 |
| JP | 2004136357 | 5/2004 |
| JP | 2005311298 | 11/2005 |
| JP | 2006518472 | 8/2006 |
| JP | 2007276544 | 10/2007 |
| JP | 2011123790 | 6/2011 |
| JP | 2012044188 | 3/2012 |
| JP | 2012162756 | 8/2012 |
| JP | 2014168814 | 9/2014 |

OTHER PUBLICATIONS

Tadatomo, Suga, Current Status and Future Outlook of Room-Temperature Joining, Current Status of Ultraprecise Interface Joining, Special Issue of the Journal of the Japan Welding Society, Jun. 5, 1995, pp. 282-288, vol. 64, No. 4, Japan Welding Society, Japan.

*Primary Examiner* — Terressa Boykin
(74) *Attorney, Agent, or Firm* — Fay Sharpe LLP

(57) ABSTRACT

A stiff, lightweight metal laminate includes a first continuous metal layer, a second continuous metal layer, and a reduced density metal core layer disposed between the first and second continuous metal layers. The reduced density metal core layer comprises a core metal and has an average density that is less than the density of the core metal. Planar metallurgical bonds secure the first and second continuous metal layers to the reduced density metal core layer. The metal laminate may be manufactured by press rolling the reduced density metal core layer sandwiched between the two continuous metal layers, after removing or overcoating the native oxide layer on each layer surface that contacts another layer in the metal laminate.

21 Claims, 11 Drawing Sheets

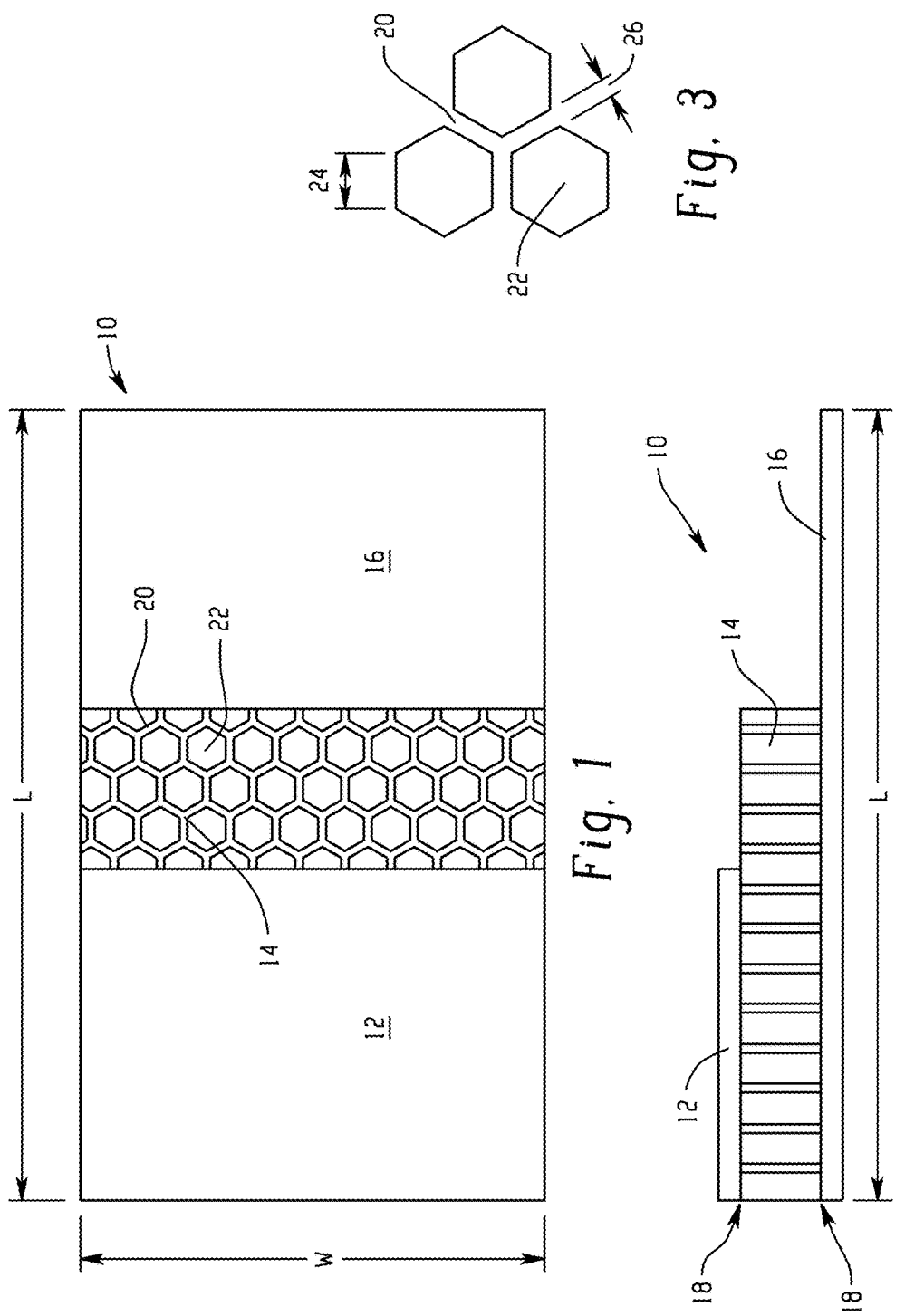

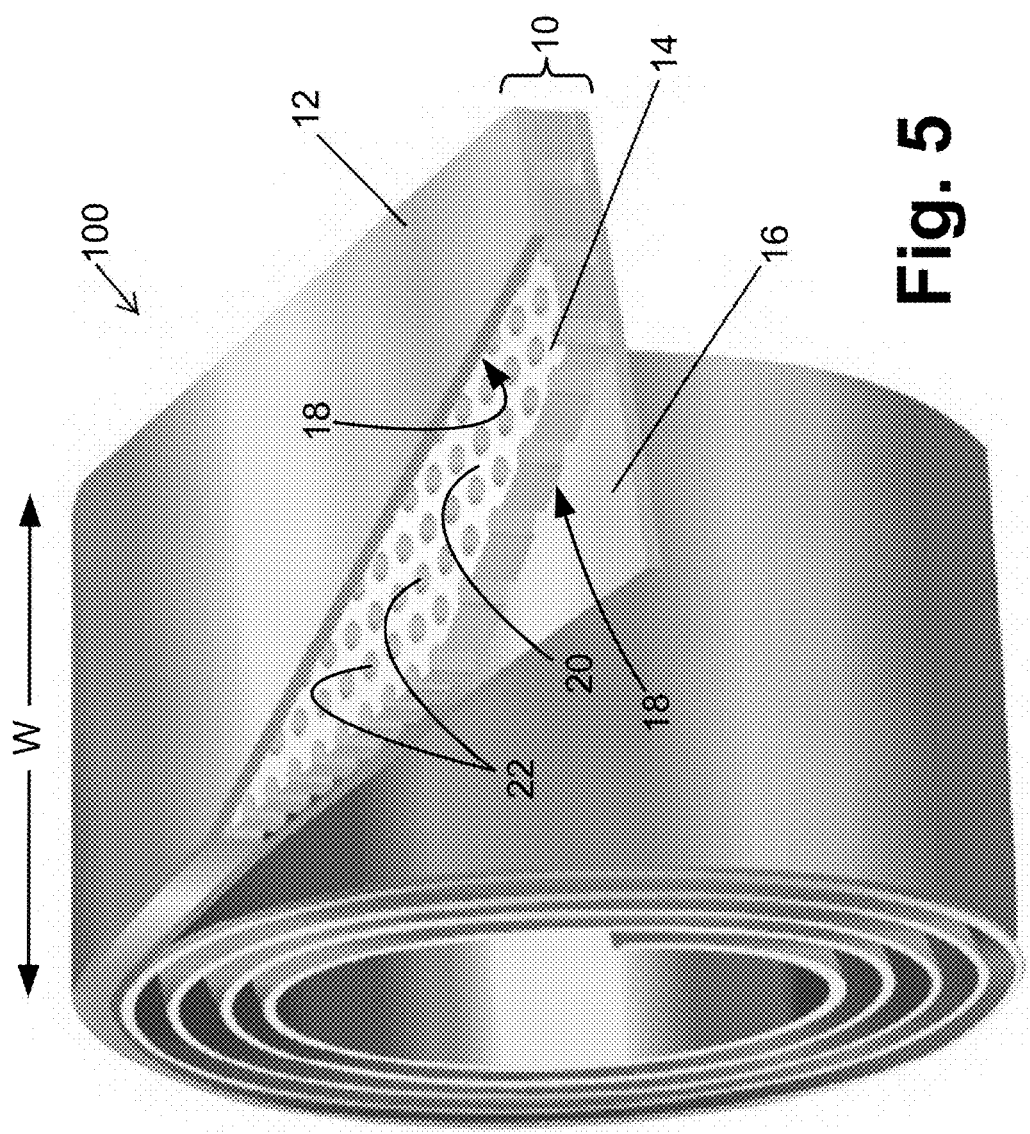

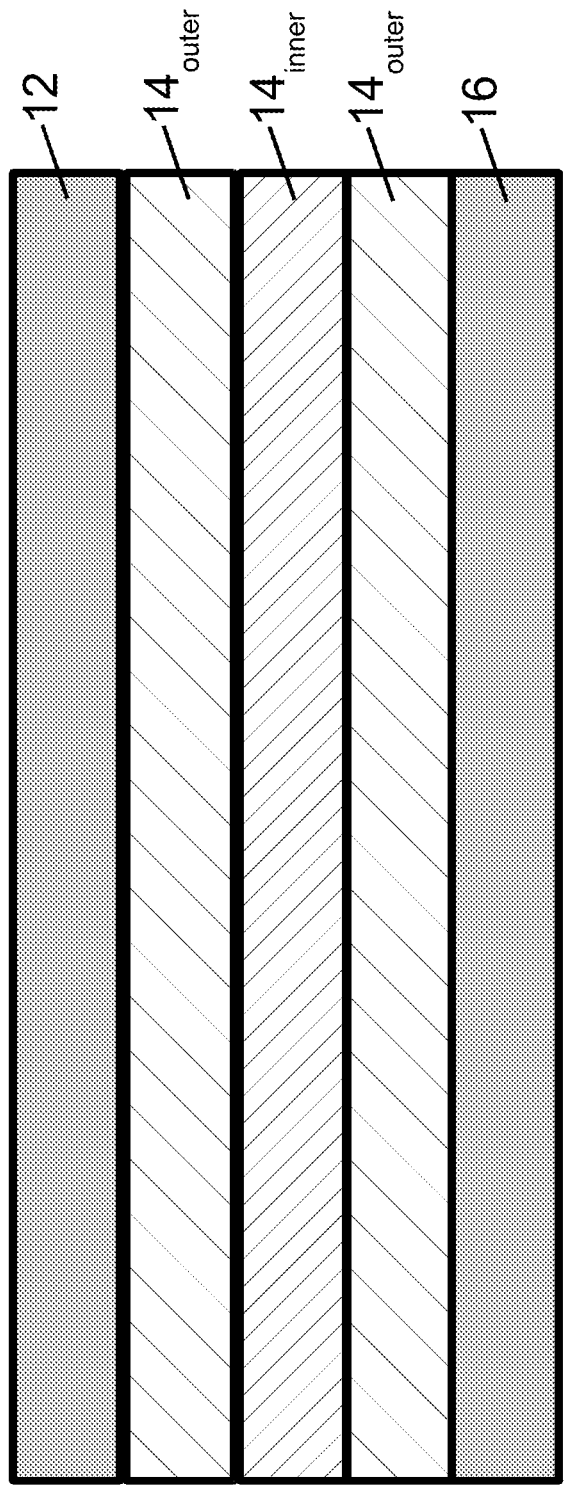

DEVICES INCLUDING METAL LAMINATE WITH METALLURGICAL BONDS AND REDUCED-DENSITY METAL CORE LAYER

CROSS-REFERENCE TO RELATED APPLICATIONS

This application is a divisional of U.S. patent application Ser. No. 14/879,831, filed Oct. 9, 2015, now U.S. Pat. No. 9,889,632, which claims priority to U.S. Provisional Patent Application Ser. No. 62/061,824, filed Oct. 9, 2014, and to U.S. Provisional Patent Application Ser. No. 62/181,436, filed Jun. 18, 2015. These applications are incorporated herein by reference in their entireties.

BACKGROUND

The present disclosure relates to stiff sheet materials usable to reduce the weight of stamped metal components, and particularly to a metal laminate sheet material.

The need for lightweight materials is widespread across many industries. In the automotive and aerospace industries, lightweight materials are desired for improved fuel economy. In consumer recreational equipment, lightweight sheet material is desired for enhanced performance. In consumer electronics and mobile devices, using lightweight sheet material for device housings and other components enhances portability and provides a lighter device. More generally, manufacturers in such industries make efforts to reduce the weight and thickness of components, while still selecting materials with high specific strength and specific stiffness values and/or with other desired properties.

The use of composite materials continues to expand as a pathway toward lightweight materials. These may include carbon or glass fiber composites, metal matrix composites, honeycomb core materials or various other common configurations. However, composite material solutions typically have a high cost of manufacturing. For carbon fiber, this includes the cost of the lay-up and impregnation of the matrix material. Manufacture of metal matrix composites typically require powder metal processing in relatively small batches. The high cost of manufacturing of these composite materials is an impediment to their large scale adoption.

Further, conventional, low cost, metal forming processes such as stamping and forming from a metal coil, which are used for many high volume components, are sometimes incompatible with composite materials.

Thus, there is an ongoing need to provide light, stiff, easily formed sheet materials for use in applications calling for lightweight but stiff sheet materials, and/or which are compatible with existing metalworking infrastructure for stamping and forming of metal components.

SUMMARY OF THE DISCLOSURE

The disclosure of this application is to be considered in its entirety, i.e. as a whole, including all text and drawings.

Disclosed in various embodiments are metal laminates comprising: a first continuous metal sheet; a second continuous metal sheet; and a reduced density metal core layer disposed between the first continuous metal sheet and the second continuous metal sheet, the reduced density metal core layer comprising a core metal and having an average density that is less than the density of the core metal; and a planar metallurgical bond securing the first continuous metal sheet to the reduced density metal core layer; and a planar metallurgical bond securing the second continuous metal sheet to the reduced density metal core layer.

The core metal may be aluminum, copper, titanium, stainless steel, carbon steel, or an alloy thereof. The first continuous metal sheet may comprise aluminum, copper, titanium, carbon steel, stainless steel, or an alloy thereof; and the second continuous metal sheet may comprise aluminum, copper, titanium, carbon steel, stainless steel, or an alloy thereof.

In specific embodiments, the core metal is aluminum, the first continuous metal sheet is a stainless steel, and the second continuous metal sheet is a stainless steel.

The thickness of the reduced density metal core layer may be at least 50% of the total thickness of the metal laminate. The average density of the reduced density metal core layer may be between 10% and 75% of the density of the core metal. In more specific embodiments, the average density of the reduced density metal core layer is 50% or less of the density of the core metal. The reduced density metal core layer may comprise a layer of the core metal having through holes passing through the layer. The through holes may be asymmetric. The through holes can have a size that is at least as large as the thickness of the reduced density metal core layer. The through holes may have a size that is at least twice as large as the thickness of the reduced density metal core layer. In more particular embodiments, the reduced density metal core layer comprises one of (1) a layer of the core metal having through holes passing through the layer, (2) a woven or welded wire mesh or screen of the core metal, and (3) a porous layer of the core metal.

The reduced density metal core layer can comprise a stack of two or more reduced density metal core layers. The stack of two or more reduced density metal core layers may comprise reduced density metal core layers with different geometries of through holes, woven or welded meshes or screens, or porosities. The stack of two or more reduced density metal core layers can comprise reduced density metal core layers of different core metals.

In specific embodiments, the planar metallurgical bonds of the metal laminate do not include a brazing or soldering material. In addition, in even more particular embodiments, the planar metallurgical bond securing the first continuous metal sheet to the reduced density metal core layer does not include a native oxide layer of a surface of the first continuous metal sheet and does not include a native oxide layer of a surface of the reduced density metal core layer; and the planar metallurgical bond securing the second continuous metal sheet to the reduced density metal core layer does not include a native oxide layer of a surface of the second continuous metal sheet and does not include a native oxide layer of a surface of the reduced density metal core layer.

In some embodiments, the planar metallurgical bond securing the first continuous metal sheet to the reduced density metal core layer is formed by a process including (1) removing or overcoating a native oxide layer on a surface of the first continuous metal sheet and removing or overcoating a native oxide layer on a surface of the reduced density metal core layer and (2) press rolling the first continuous metal sheet and the reduced density metal core layer; and the planar metallurgical bond securing the second continuous metal sheet to the reduced density metal core layer is formed by a process including (1) removing or overcoating a native oxide layer on a surface of the second continuous metal sheet and removing or overcoating a native oxide layer on a surface of the reduced density metal core layer and (2) press rolling the second continuous metal sheet and the reduced density metal core layer.

The press rolling of the first continuous metal sheet and the reduced density metal core layer and the press rolling the second continuous metal sheet and the reduced density metal core layer may be performed simultaneously as a press rolling the first continuous metal sheet and the reduced density metal core layer and the second continuous metal sheet with the reduced density metal core layer sandwiched between the first and second continuous metal sheets.

The metal laminate may include a pattern formed on an outer surface of the laminate that is embossed or imprinted from a pattern of through-holes of the reduced density metal core layer.

The metal laminate may comprise a laminate coil.

Also disclosed herein are methods of manufacturing a metal laminate, comprising: press rolling a metal laminate including a reduced density metal core layer sandwiched between two outer continuous metal layers wherein the reduced density metal core layer comprises a core metal and has an average density that is less than the density of the core metal; and prior to the press rolling, removing or overcoating the native oxide layer on each surface of the reduced density metal core layer and of the continuous metal sheets that contacts another layer in the metal laminate.

The press rolling may produce a rolling reduction in the thickness of the metal laminate that is 50% or lower, or that is 25% or lower. The press rolling may produce a rolling reduction in the thickness of the reduced density metal core layer that is 60% or lower, or that is 40% or lower.

The reduced density metal core layer may include through holes providing the reduced density metal core layer with the average density that is less than the density of the core metal. The press rolling should not eliminate the through-holes of the reduced density metal core layer.

The pressure applied in the press rolling may be effective to emboss or imprint a pattern of the through-holes of the reduced density metal core layer onto an exterior surface of the metal laminate.

The press rolling may metallurgically bond the two outer continuous metal layers to the reduced density metal core layer.

The operation of removing or overcoating the native oxide layer on each surface of the reduced density metal core layer and of the continuous metal sheets that contacts another layer in the metal laminate may comprise removing the native oxide layer on each said surface. This can be done using a sputtering process.

The methods disclosed herein can be performed in a sealed enclosure that encloses both press rollers used in the press rolling and surface activation devices used in the removing or overcoating of the native oxide layer on each said surface.

The methods may further comprise taking up the metal laminate on a take-up roll to arrange the metal laminate as a laminate coil. The methods do not necessarily include performing soldering or brazing in the manufacture of the metal laminate.

Also disclosed herein are metal laminates or laminate coils manufactured using the methods disclosed herein.

BRIEF DESCRIPTION OF THE DRAWINGS

The following is a brief description of the drawings, which are presented for the purposes of illustrating the exemplary embodiments disclosed herein and not for the purposes of limiting the same. Unless otherwise indicated, the drawings are diagrammatic and not necessarily drawn to scale.

FIGS. 1 and 2 show schematically a top and side view, respectively, of a lightweight metal laminate structure with a reduced-density metal core layer. In FIGS. 1 and 2, layers are removed successively moving from left to right to reveal underlying layers in the top view of FIG. 1.

FIG. 3 is a detail, shown in top view, of one geometry option for the reduced-density metal core layer of the laminate structure of FIGS. 1 and 2.

FIG. 5 shows a perspective view of a laminate roll of the laminate of FIGS. 1 and 2, suitably manufactured as a roll using the system of FIG. 4.

FIGS. 13 and 14 schematically show side views of two laminate structures, each of which includes a stack of reduced-density metal core layers.

DETAILED DESCRIPTION OF THE DISCLOSURE

Figure 4:
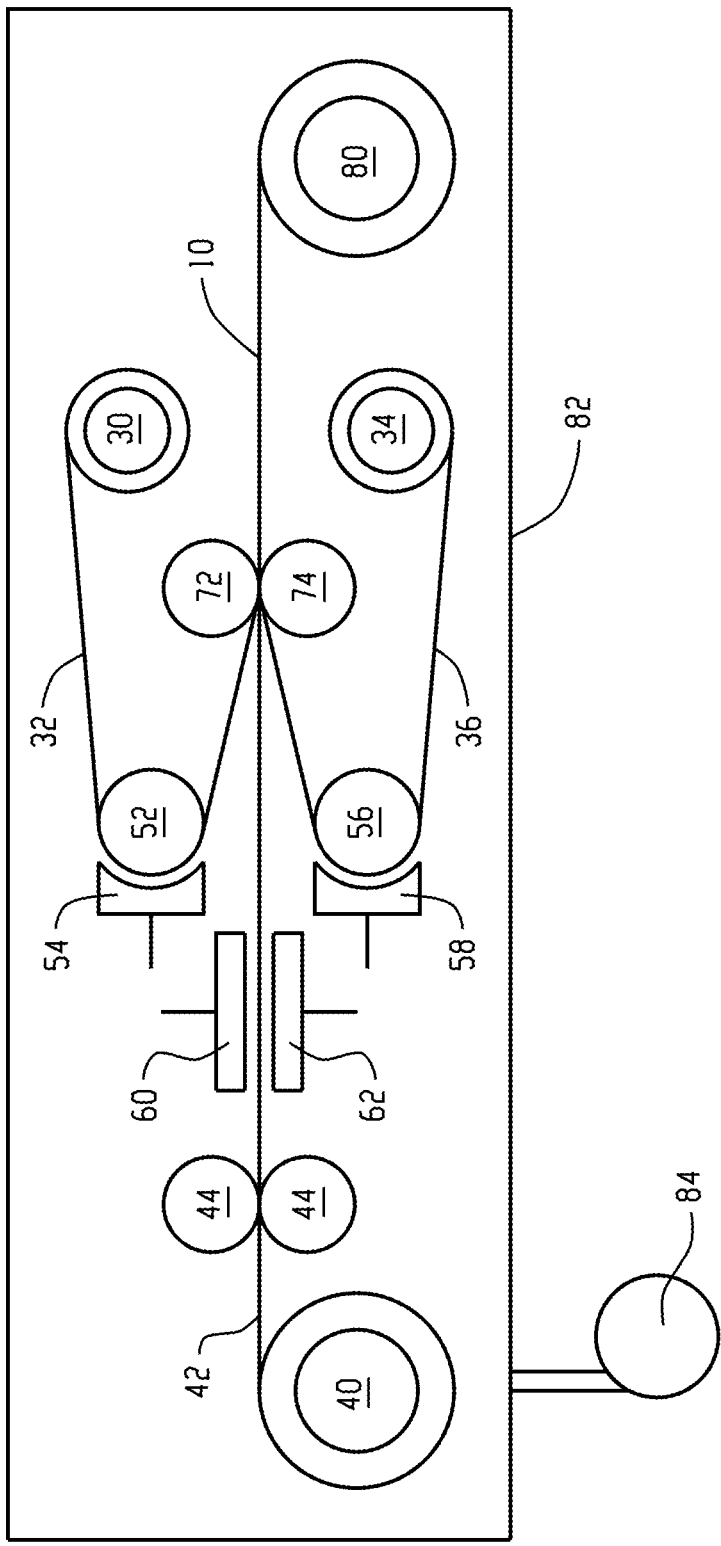
FIG. 4 illustrates a suitable manufacturing system for manufacturing the metal laminate structure of FIGS. 1 and 2 using illustrative cladding processing to form a metallurgical bond between the layers.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named component and allowing the presence of other components. The term "comprising" should be construed to include the term "consisting of", which allows the presence of only the named component, along with any impurities that might result from the manufacture of the named component.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

The modifier "about" used in connection with a quantity is inclusive of the stated value and has the meaning dictated by the context. When used in the context of a range, the modifier "about" should also be considered as disclosing the range defined by the absolute values of the two endpoints. For example, the range of "from about 2 to about 10" also discloses the range "from 2 to 10." The term "about" may refer to plus or minus 10% of the indicated number. For example, "about 10%" may indicate a range of 9% to 11%, and "about 1" may mean from 0.9-1.1.

In some embodiments disclosed herein, a multilayer metal structure has a perforated (e.g., porous or expanded) metal core and metal continuous outside sheets. More generally, the metal core layer is a reduced-density metal core layer, in which the density is reduced as compared with an equivalent layer of the same metal that does not include the perforations, porosity, or other spaces/vacancies that serve to reduce layer density. (In this context, "density" is to be understood as the average density over a volume of the metal core, i.e. the ratio of core layer mass divided by core layer volume.) The multilayer metal structure provides high strength and stiffness, while reducing component weight. A metallurgically bonded metal sheet material comprises a reduced-density metal core layer of substantially uniform thickness, which in some embodiments is less than 3 millimeters although higher thicknesses are contemplated, and two continuous metal sheets metallurgically bound to the major surfaces of the porous metal core. In some embodiments, each metal sheet is less than 0.5 millimeters in thickness, although greater thicknesses are contemplated, and moreover the two continuous metal sheets may in general have different thicknesses.

In such a composite sheet, the continuous metal sheets may be secured to the reduced-density metal core layer by techniques such as brazing, soldering, or using an adhesive. However, the bond formed by such techniques includes an intermediate layer (the braze material, solder material, or adhesive) which limits structural integrity—accordingly, the composite sheet formed using brazing, soldering, or adhesive may be incompatible with metalworking techniques such as deep drawing that generate large strain. Brazes and adhesives are also have significant thickness, and are usually applied in a liquid or molten state that can be difficult to apply uniformly in a large-scale processes, especially reel-to-reel processes. A metallurgical bond, that is, a bond at the atomic level with no intervening bond material and no intervening oxide layer, has good structural integrity and is compatible with metalworking processes that introduce high strain. A metallurgical bond is also "dry-formed", that is, does not involve depositing a liquid or molten material onto the surfaces. However, obtaining a metallurgical bond over a planar interface is difficult.

One technique which can form a planar metallurgical bond is cladding, in which two metal sheets are pressed together under high pressure, usually between rollers. Cladding breaks the surface oxide and forms a metallurgical bond between the two sheets. However, in order to overcome the intrinsic oxide layers on the metal surfaces a high pressure must be applied, resulting in a high rolling reduction (i.e. compressive plastic deformation manifesting as a reduction in layer thickness and elongation transverse to that thickness). In the case of a reduced-density metal core layer, the high cladding pressure may compress or deform the reduced-density metal core layer to such an extent that its (average) density is substantially increased, and/or its structural integrity compromised, thereby abrogating its beneficial characteristics.

In some embodiments disclosed herein, a metallurgically bonded metal sheet comprises a porous metal core, having a multiplicity of thru holes surrounded by a matrix of metal (or, said another way, a metal layer with thru holes), having a substantially uniform thickness of less than 3 millimeters and having the surface area of the matrix on the major surfaces of the core being less than one half of the surface area of a sheet of the same size provides sufficient strength. A porous metal core having a substantially uniform pattern of holes surrounded by short segments of continuous metal matrix provides a suitable core for a metallurgically bonded metal sheet material having advantageous mechanical characteristics and reduced weight when thin sheets are metallurgically bound to the core.

In some embodiments disclosed herein, a laminate including a reduced-density metal core layer cladded by continuous metal sheets is made by the following operations. The reduced-density metal core layer is provided, which has a first major surface, a second major surface and a multiplicity of thru holes, pores, or other density-reducing features. Two continuous metal sheets are also provided, each having two major surfaces and, in some embodiments, a thickness of less than 0.5 millimeters. At least one of the major surfaces of each of the metal sheets is activated. Both of the major surfaces of the reduced-density metal core layer are activated. The metal sheet activated surfaces are brought into contact with the activated major surfaces of the reduced-density metal core layer and the metal sheets are metallurgically bonded onto the reduced-density metal core layer (i.e., with the reduced-density metal core layer sandwiched between the continuous metal sheets) in a rolling operation with a rolling reduction of from 0.1% to 50% reduction (that is, a reduction of 0.1%-50% in the total thickness of the stack produced by the rolling operation). In some preferred embodiments, the rolling reduction is 25% or less reduction in total stack thickness. The rolling operation causes the metal sheets and the reduced-density metal core layer to be metallurgically bound together. The planar metallurgical bonds thereby formed are free of organic adhesive, brazed metal, or solder (i.e. none of these three are present). In some illustrative embodiments, the activation of the metal sheet surfaces and the surfaces of the reduced-density metal core layer is preferably achieved by sputtering.

In general, the activation of the surfaces entails removal of contaminants that are natively present on the metal surfaces due to exposure to air. For example, a native surface oxide is present due to air exposure. Other contaminants such as various hydrocarbons may also be present on the air-exposed metal surfaces. Activation of the metal sheet and reduced-density metal core layer surfaces entails removing these contaminants, especially the native surface oxide. Sputtering is one suitable approach, while other contemplated surface activation approaches for producing clean, oxide-free, metal surfaces include thermal removal (heating to a temperature sufficient to expel the surface oxide). In other surface activation processes, the surface oxide and/or other surface contamination is not removed, but rather is overcoated with a thin coating of a pristine metal layer with thickness of typically 10 micrometers (μm) or less, and more preferably a thickness of 2 μm or less, using a physical vapor deposition process (e.g. sputter deposition, vacuum evaporation, or so forth). The overcoated pristine metal layer may be the same type of metal as the metal sheet or may be a different metal. For overcoating the surface of a stainless steel sheet, the overcoating pristine metal layer may, by way of non-limiting example, be a nickel, aluminum, iron, copper, or titanium metal layer. In addition to being thin, the surface of the overcoated pristine metal layer should not have an oxide layer. More generally, the surface activation (whether by removal of the native oxide or overcoating) is performed in a controlled ambient, e.g. vacuum or inert gas, in order to prevent rapid re-oxidation of the activated surfaces.

By performing the cladding of the continuous metal sheets onto the reduced-density metal core layer after surface activation including oxide removal in a controlled atmosphere (e.g. inert or vacuum), the cladding pressure can be substantially reduced as compared with conventional cladding processes that must break the oxide layer in order to form the metallurgical planar surface bonds. The reduced cladding pressure enables the reduced-density metal core layer to better retain its reduced density by reducing or eliminating compressive plastic deformation of the pores, through-holes, or other density-reducing features. A lightweight laminate material with metallurgical bonds is thereby obtained, which is structurally robust and suitable for metalworking processes such as deep drawing that introduce large strains.

On the other hand, depending upon the applied cladding pressure, the size and shape of the through-holes or other density-reducing features of the reduced-density metal core layer, the thicknesses, stiffness, or other properties of the cladding continuous metal sheets, and possibly other factors, a consequence of the bonding of the reduced-density metal core layer and continuous sheet materials may be that the resulting laminate sheet exhibits a surface pattern corresponding to the pattern of through-holes or other openings of the reduced-density metal core layer. Such patterning may be due to slight deformation (i.e. slight "bulging") of the continuous metal sheets into the through-holes of the reduced-density metal core layer, or due to a surface texture change due to differential pressures of the bonding rolls on the laminate surface over a thru-hole vs. over the matrix. Without being limited to any particular theory of operation, it is believed that during cladding the pressure exerted over a through-hole is less than the pressure exerted in the area over the "matrix" of the core, due to very small elastic deflections of the surface sheets. As a result, texture differences are present on the exposed surfaces of the cladded surface sheets that may emboss or imprint a pattern on the surface, even if the surface is flat after bonding (i.e. does not include measurable bulging of the surface sheets into the through-holes). It is recognized herein that this effect may be advantageous, for example providing ornamental surface properties intentionally designed into the bonded laminate composite material by choosing an ornamental pattern for the through-holes of the reduced-density metal core layer. Such a pattern could, for example, represent the logo of a consumer electronics manufacturer using the composite material for the metal housing of a mobile device. In other applications, the surface patterning may provide surface texturing or roughness that may beneficially increase friction or provide other useful surface properties.

The resulting composite laminate material can be constructed with sufficient strength and stiffness to be used as a cost effective replacement for solid sheet metal structural components. The composite laminate material can be light, stiff, formable by conventional metalworking methods, uniform in characteristics, has a low cost of manufacturing, and is free of organic adhesives, brazing compounds, or solder.

A more complete understanding of the components, processes and apparatuses disclosed herein can be obtained by reference to the accompanying drawings. The drawings are provided for the purposes of illustrating preferred implementations of the disclosure only, and not for the purposes of limiting the disclosure.

FIGS. 1 and 2 show top (i.e. plan) and side views, respectively, of a laminate sheet material 10 having three layers. The laminate sheet material 10 has a width W indicated in FIG. 1, and a long direction indicated by arrow L. In a typical roll-to-roll manufacturing process (illustrative examples of which are described later herein with reference to FIGS. 4 and 5), the roll has the width W and extends (i.e. is "rolled") in the long direction L. Accordingly, FIGS. 1 and 2 illustrate a portion or cut length of the laminate sheet that is cut along the direction L.

The laminate sheet material 10 includes a top metal layer 12 which is a continuous thin sheet (i.e. layer) of metal. In one embodiment, the top layer 12 can be in the neighborhood of 0.1 millimeters thick and is a continuous sheet of stainless steel, although greater or lesser thicknesses are contemplated. A reduced-density metal core layer 14 is of equal width W to the top metal layer 12 and comprises short interconnected metal segments 20 surrounding through holes 22 (see also detail FIG. 3). As best seen in the detail drawing of FIG. 3, the illustrative through holes 22 are hexagonal holes so that the reduced-density metal core layer 14 has a honeycomb pattern of through-holes. A honeycomb pattern is advantageous because the hexagonal openings 22 can form a highly symmetric regular lattice, but as described herein the reduced-density metal core layer 14 can have a wide variety of density-reducing openings, through-holes, ports, gapped fiber mesh, or so forth. The reduced-density metal core layer 14 is fabricated from a metal selected to have desired material properties. In one illustrative example, the reduced-density metal core layer 14 is aluminum or an aluminum alloy, and is about 0.5 millimeters thick (although again this is merely an example, and greater or lesser thicknesses are contemplated). In other embodiments, the reduced-density metal core layer 14 can have a thickness of up to 3 millimeters (although again higher thicknesses are contemplated). In other embodiments, the reduced-density metal core layer 14 comprises another metal, such as titanium, stainless steel, carbon steel, or copper.

The reduced-density metal core layer 14 can be made by die cutting, stamping or other methods to produce a metal sheet having spaces 22 between metal matrix elements 20. Various processes may be employed to create a perforated metal by punching out spaces 22 to form a repetitive pattern of holes. Another suitable process comprises expanding a metal sheet to form the spaces 22 by cutting the metal sheet with short spaced slits and stretching the metal sheet to plastically deform the metal sheet and thereby expand these slits into through holes 22. An advantage of this expanded metal process is that all the metal in the sheet is used and no punched out waste is created. (Note that in the expanded metal process the density of the sheet is reduced by enlarging the volume, because the overall length is increased while the mass stays the same so that average density=mass/volume decreases.)

Instead of employing through-holes, the reduced-density metal core layer can have other density-reducing space configurations. For example, the reduced-density metal core layer may be a woven or welded wire mesh or screen, where density reduction is achieved by the large amount of porosity or air spaces surrounding the woven metal fibers. Other approaches for fabricating the reduced-density metal core layer with reduced density compared with a continuous metal sheet of the same metal that does not include pores, through-holes, or the like is contemplated. In some illustrative examples, the reduced-density metal core layer has a porosity of from about 10% to about 90% by volume, as determined by the amount of open area divided by the total area of the core. In other words, in these embodiments the reduced density metal core layer 14 has an average density that is between 10% and 90% inclusive of the density of the core metal (where "density of the core metal" is the density of the core metal, i.e. the density of the core metal material, which is an intensive property). In more particular embodiments, the porosity is at least 50% (that is, the average density of the reduced density metal core layer 14 is 50% or less of the density of the core metal). In some embodiments the porosity of the reduced density metal core layer 14 is between 25% and 90% (that is, the average density of the reduced density metal core layer 14 is between 10% and 75% inclusive of the density of the core metal). In some embodiments the porosity of the reduced density metal core layer 14 is between 50% and 90% (that is, the average density of the reduced density metal core layer 14 is between 10% and 50% inclusive of the density of the core metal).

The laminate sheet material 10 further includes a bottom metal layer 16 which is a thin continuous metal sheet (i.e. thin continuous metal layer). In an illustrative example, the top layer 12 and the bottom layer 16 are both stainless steel and about 0.1 millimeters thick. In the laminate 10, the reduced density metal core layer 14 is sandwiched between the two outer continuous metal sheets or layers 12, 16. The two continuous metal sheets or layers 12, 16 form the outer "skins" of the laminate 10, and accordingly are sometimes referred to herein as (outer) metal skins 12, 16. In other embodiments, the top layer 12 and the bottom layer 16 can have the same or different thicknesses, with a thickness of up to 0.5 mm in some embodiments. Again, these are merely illustrative examples, and other thicknesses (e.g. greater than 0.5 mm) are also contemplated. In some embodiments, the two layers 12, 16 have the same thickness which provides a symmetry that may be advantageous for some applications (e.g., it therefore does not matter which sheet 12, 16 is employed as the "top" sheet in a structure), but this symmetry is not required.

In an illustrative embodiment with commercial value in various industries, the continuous metal sheets 12, 16 are stainless steel sheets while the reduced-density metal core layer 14 is an aluminum or aluminum alloy metal. In other embodiments, the top and bottom metal layers are aluminum, titanium, carbon steel, or copper. Again, the two layers 12, 16 may be made of the same material providing possibly advantageous symmetry, but this is not required. It should also be noted that it is contemplated for the reduced-density metal core layer 14 to be made of the same material as the continuous metal sheets 12, 16.

The reduced-density metal core layer 14 is also relatively thin and, as in preferred embodiments more than half of its mass has been removed in creation of the thru holes or other density-reducing vacancy features. The three layers 12, 14, 16 are metallurgically bound together at their contacting surfaces by planar metallurgical bonds 18, i.e. the metals of the layers are directly bound to each other without the presence of organic adhesives, brazing compounds or solder. The creation of this laminate sheet material 10 employs manufacturing techniques performed in a vacuum, inert gas, or other controlled atmosphere to prevent re-formation of a native surface oxide after activating the contacting metal surfaces. (Moreover, many surface activation techniques suitably used to activate the contacting surfaces can only be performed in a certain controlled atmosphere, e.g. a vacuum backfilled with a sputtering gas or so forth). In various embodiments, the thickness of the core is at least 50% of the total thickness of the laminate material, and in some preferred embodiments is from about 50% to about 95% of the total thickness of the metal laminate.

As used herein, the term "aluminum" includes pure aluminum and aluminum alloys. For example, the reduced-density metal core layer 14 may comprise a core metal such as an aluminum alloy such as 1000 series aluminum alloy (i.e., an alloy containing a minimum aluminum content of 99 wt %), a 2000 series alloy (i.e., an alloy containing copper), a 3000 series alloy (i.e., an alloy containing manganese), a 4000 series alloy (i.e., an alloy containing silicon), a 5000 series alloy (i.e., an alloy containing magnesium), a 6000 series alloy (i.e., an alloy containing magnesium and silicon), a 7000 series alloy (i.e., an alloy containing zinc), or an 8000 series alloy (i.e., an alloy containing other elements not covered by the other series). Some specific alloys that may be of particular suitability as the core metal in certain industrial applications include 2024, 5052, 6061 or 7075.

Referring now to FIG. 4, an illustrative method and apparatus for creating the laminate sheet material 10 is described. A first feed roll 30 supports a coil of a first continuous metal sheet 32 that in the laminate 10 forms the top continuous metal layer 12. A second feed roll 34 supports a coil of a second continuous metal sheet 36 that in the laminate 10 forms the bottom continuous metal layer 16. A third feed roll 40 supports a coil of a reduced-density metal sheet 42 that in the laminate 10 forms the reduced-density metal core layer 14. The sheet 42 can be pre-perforated before coiling on the feed roll 40 or, alternatively, the sheet 42 can be a continuous metal sheet that is perforated by optional die cutting rolls 44 or the like. The first continuous metal sheet 32, the second continuous metal sheet 36, and the reduced-density metal sheet 42 are each drawn from their respective feed rolls 30, 34, 40 into respective activation apparatuses. The first continuous metal sheet 32 wraps around a portion of a first electrode roll 52, and a first activation device 54 is supported adjacent the first electrode roll 52. For example, the activation device 52 may be a sputtering device in which a plasma is created between the first electrode roll 52 and the first activation device 54 which activates the surface of the first continuous metal sheet 32 not engaged against the first electrode roller 52. This activation removes (e.g. sputters away) impurities, oxides and other impediments to further processing of the first continuous metal sheet 32. Some suitable sputtering devices are described, for example, in Saijo et al., U.S. Pat. No. 6,150,037 and Saijo et al., U.S. Pat. No. 7,175,919, which are incorporated herein by reference. In other embodiments, the activation is by way of "burying" the oxide/impurities layer by overcoating with a suitable metal layer. Some suitable overcoating approaches are disclosed, for example, in Yano et al., U.S. Pat. No. 6,455,172 and Marancik, U.S. Pat. No. 4,011,982 which are incorporated herein by reference. Similarly, the second continuous metal sheet 36 is drawn off the second feed roll 34 and wraps partially around the second electrode roller 56, where a second activation device 58 supported adjacent the second electrode roller 56 activates (e.g. sputters) the exposed surface of the second continuous metal sheet 36.

The reduced-density metal sheet 42 (after passing through the die cutting rollers 44, if used) is passed between a third activation device 60 and a fourth activation device 62 to activate the opposing sides of the sheet 42, again for example by sputtering. In the configuration shown in FIG. 4, both sides are activated at the same time as the sheet 42 passes between the devices 60, 62; alternatively, this processing may be performed serially (not shown). If the third and fourth activation devices 60, 62 are disposed in opposition as shown, electrical contact to the metal sheet 42 can be provided through adjacent support rollers or the like (not shown).

Following activation, the metal sheets 32, 36, 42 are brought into adjacency and pressed together between press rolls 72, 74. A controlled compression force is applied so as to metallurgically bind them together in a low reduction solid state bonding process to form the laminate 10 of FIGS. 1 and 2. Because the native oxide is removed or overcoated with a thin metal layer (that is itself free of native oxide) before the press rolling, the metallurgical bonds 18 can be formed at much lower compression force as compared with a conventional cladding process, and the lower compression force enables cladding with reduced deformation of the reduced-density metal core layer 14. The compression force can be usefully quantified in terms of the plastic deformation introduced to the material. For example, in some embodiments, the pressing force is limited to provide less than 10% change in length of the laminated sheet material 10 exiting the press rolls 72, 74 when compared to the length of the continuous metal sheets 32, 34 and metal core material 42 fed into the press rolls 72, 74. Additionally or alternatively, the reduction in thickness of the laminate may be used as a metric of the compression force. As the resulting laminate 10 is intended to be lightweight (that is, of low overall density), it is desired to limit the amount of plastic compression (i.e. thickness reduction) introduced by the press rolling. In other words, it is desired to have a low rolling reduction as measured by the reduction in thickness introduced by the press rolling process. A low rolling reduction is achieved using the apparatus of FIG. 4 in part because contacting activated surfaces much more readily form a metallurgical bond during the press rolling as compared with contacting surfaces that have the usual native oxide. The "native oxide" is an oxide layer that inherently forms on most uncoated or pristine metal surfaces, including surfaces of steel and aluminum, upon even very brief exposure of a metal surface to air. By removing the oxide layers of the surfaces of the layers that contact other layers in the resulting laminate before the press rolling, the force (or pressure) that needs to be applied to form the metallurgical bonds 18 is greatly reduced, which in turn greatly reduces the rolling reduction. In some actually performed experiments, a rolling reduction of 25% or lower is achieved for the overall laminate 10. (That is, the percentage reduction in thickness of the stack of layers introduced by the press rolling is 25% or less). More generally, it is preferable for the rolling reduction to be kept to 50% or lower. These values are for the stack as a whole. Because the reduced density metal core layer 14 has through-holes, porosity, is constructed as a woven or welded wire mesh or screen of the core metal, or otherwise has low average density as compared with the density of the core metal, it is expected that the rolling reduction of the reduced density metal core layer 14 will be greater than the rolling reduction of the stack as a whole. For example, in actually performed experiments for which the stack as a whole exhibited a rolling reduction of 25% or lower, the rolling reduction of the reduced density metal core layer 14 (formed with through-holes) was larger, e.g. 30%. In general, the rolling reduction of the reduced density metal core layer 14 is preferably 60% or lower, and more preferably 40% or lower. Moreover, in embodiments in which the reduced density metal core layer 14 includes through-holes, the press rolling preferably does not eliminate the through-holes (although their dimensions may be altered by the press rolling).

With continuing reference to FIG. 4 and with further reference to FIG. 5, the metallurgically bonded laminate sheet material 10 output from the press rollers 72, 74 is suitably spooled onto a take-up roll 80. FIG. 5 illustrates a rolled laminate or laminate coil 100 comprising a roll of the laminate 10 having width W and including the reduced-density metal core layer 14 clad by outer continuous metal sheets 12, 16 and bound together by the planar metallurgical bonds 18 (which are naturally of a rolled configuration in the laminate coil 100), from which the portion of the laminate sheet 10 shown in FIG. 1 may be suitably cut. Advantageously, the metallurgical bonds 18 are strong bonds which maintain their integrity in the rolled configuration of the laminate coil 100. Optionally, after metallurgically bonding the laminate, a heat treatment may be performed in strand or batch processes to drive diffusion between the contacting layers and improve interfacial adhesion.

With continuing reference back particularly to FIG. 4, the entire manufacturing apparatus of FIG. 4 is contained within a sealed enclosure 82. The sealed enclosure 82 may be a vacuum chamber that is kept at a reduced pressure by operation of a vacuum pump 84. Reduced pressure is useful in the activation process occurring adjacent the activation devices 54, 58, 60, 62. Significantly reduced pressure also aids in preventing oxidation of materials following activation and supports the cladding performed by the press rolls 72, 74. In addition to (or instead of) reduced pressure, the controlled atmosphere contained in the sealed enclosure 82 may be an inert atmosphere, e.g. backfilled with an inert gas such as argon.

With brief reference to FIG. 6, the reduced-density metal core layer 14 can employ various through-hole configurations. FIG. 6A illustrates again the honeycomb through-hole pattern of the embodiment of FIGS. 1 and 3 in which hexagonal openings 22 are formed in the sheet such that the reduced-density metal core layer 14 comprises a metal matrix 20 surrounding the hexagonal openings 22. Openings with other geometries are contemplated. For example, FIG. 6B illustrates a honeycomb structure of circular (rather than hexagonal) openings. FIG. 6C shows regular Cartesian array structure of square openings. It will also be appreciated that the openings can have varying degrees of anisotropy. For example, a structure comprising anisotropic diamond-shaped openings is depicted in FIG. 6D. Employing anisotropic openings can provide the laminate with advantageous anisotropic properties, e.g. different amounts of stiffness in different directions.

Figure 7:
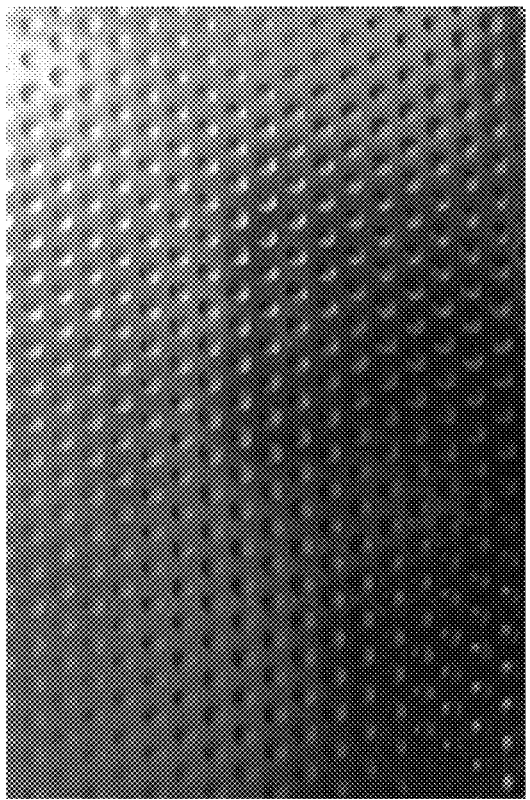
FIGS. 7 and 8 are photographs of the surface (FIG. 7) and cross-section (FIG. 8) of an actually fabricated laminate as described herein.
Figure 8:
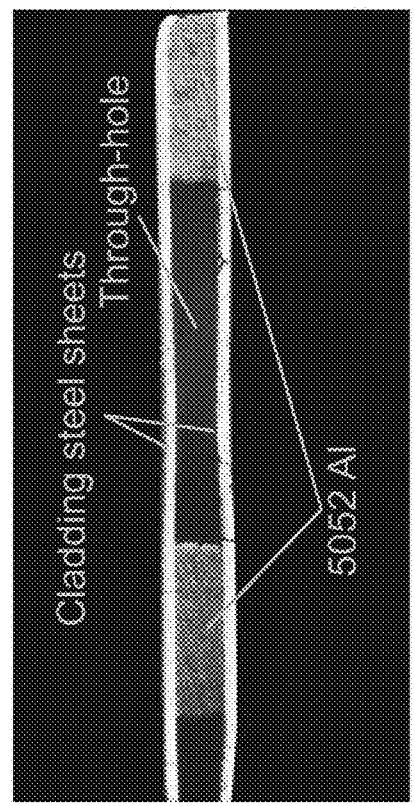

With reference now to FIGS. 7 and 8, sample sheets of the form of laminate 10 were clad as substantially described with reference to FIG. 4. The reduced-density metal core layer 14 employed circular openings as diagrammatically shown in FIG. 6B. The initial 3-layer sample was 0.035-inch gauge overall with 0.0063-inch Stainless 301 skins (corresponding to continuous metal sheets 12, 16) on both sides of a reduced-density metal core layer comprising a 0.0224-inch perforated 5052 aluminum core with 50% open area. The surface of the laminate is shown in FIG. 7, while FIG. 8 shows a cross-sectional image of the laminate. In the vacuum cladding experiments of FIGS. 7 and 8, the core gauge (that is, the thickness of the reduced-density metal core layer) decreased from 0.032-inch to 0.0224-inch, corresponding to a 30% reduction in gauge (thickness). On the other hand, the outer continuous stainless steel cladding sheets were 0.0063-inch thick and remained measured at that thickness after the vacuum cladding. Combining for all three layers, the overall reduction in gauge (thickness) was 21.5%. That is, the total rolling reduction caused by the rolling operation in this example was 21.5% reduction in total thickness, and the rolling reduction of the reduced density metal core layer was a 30% reduction in thickness.

As seen in FIG. 7, the circular openings in the perforated core created a patterned (i.e. "dimpled") effect on the exterior of the laminate, which is readily perceived visually. The cross-sectional view of FIG. 8 shows that these dimples are due to slight protrusion or bulging of the cladding steel into the through-holes. This effect is due to the through-holes being large (relative to the thickness of the continuous metal sheets 12, 16), and this surface effect can be suppressed by using a larger number of smaller through-holes relative to the steel skin thickness so as to maintain the same (average) density for the reduced-density metal core layer. The dimpling may also be suppressed by additionally or alternatively reducing the compression force applied by the press rollers 72, 74. It is straightforward to optimize this compression force to minimize the dimpling effect while providing a sufficiently strong planar metallurgical bond 18 for a given application.

On the other hand, for some applications the imprinting of the pattern of through-holes of the reduced-density metal core layer 14 on the outer surfaces of the continuous metal sheets 12, 16, such as that seen in FIG. 7, may be desirable for aesthetic reasons, or to increase surface friction, or so forth.

Figure 9:
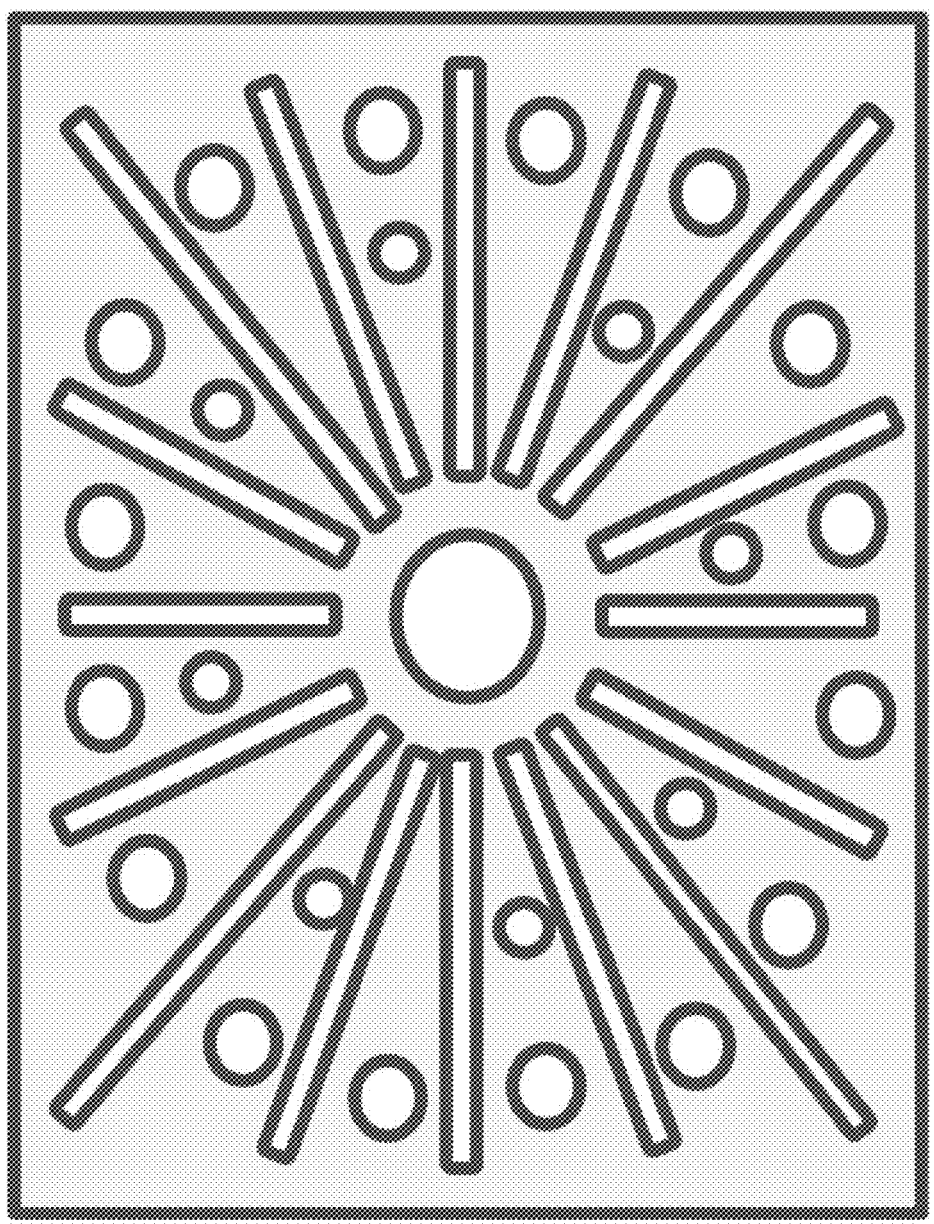
FIGS. 9 and 10 show top views of illustrative reduced-density metal core layers in which density-reducing openings define a selected pattern.

With reference to FIG. 9, for example, the through-holes of the reduced-density metal core layer 14 can optionally be formed in a chosen pattern, such as a "sun burst" pattern shown in FIG. 9, or the logo of a manufacturer, or the brand name of a product, or so forth. The openings are still chosen to be of sufficient aggregate area to provide the intended reduction in average density for the reduced-density metal core layer 14, but their specific layout is chosen to imprint a desired pattern on the surface of the resulting laminate 10.

Figure 10:
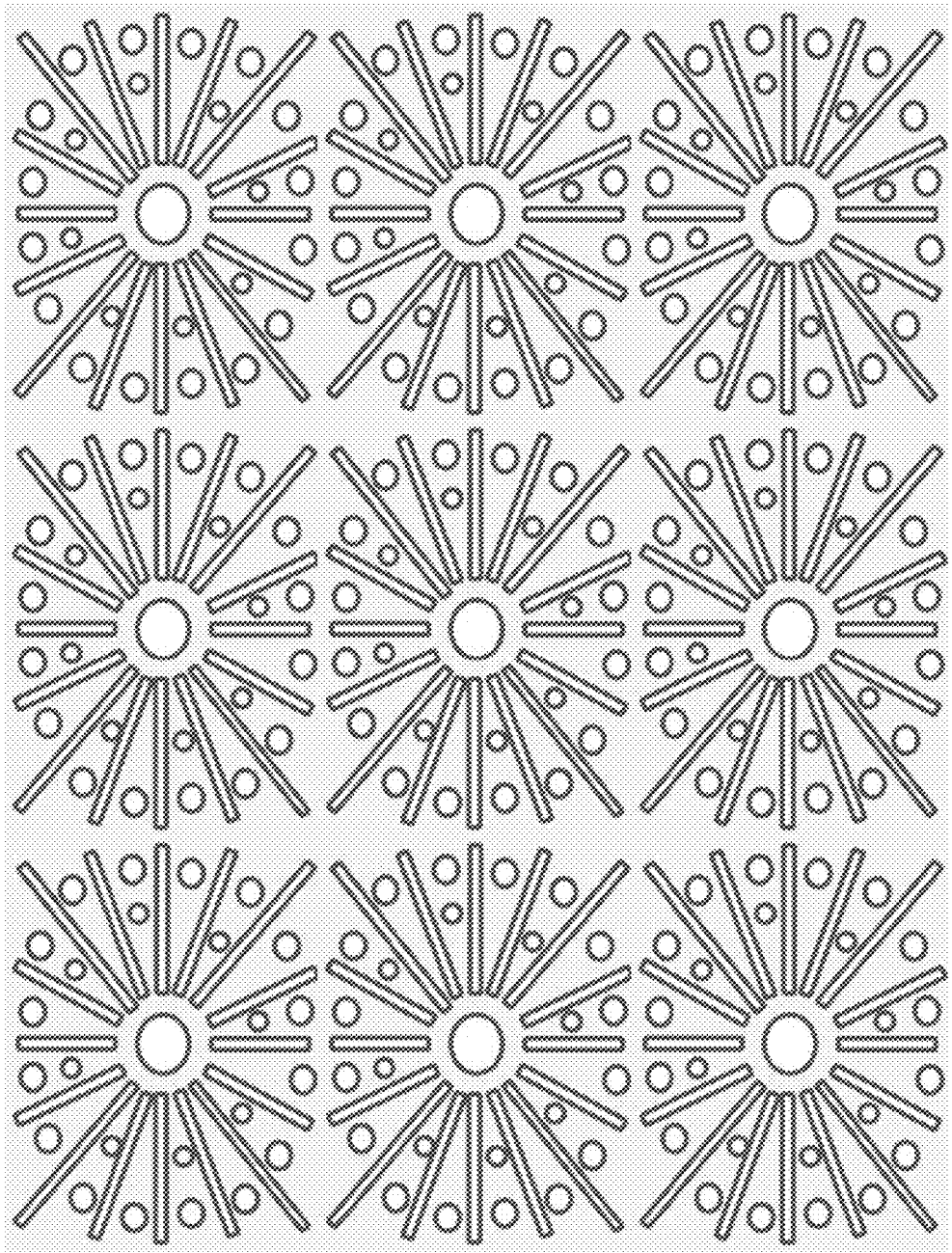

With reference to FIG. 10, in some embodiments the sun burst pattern shown in FIG. 9 serves as a repeating unit cell of the through-hole pattern of reduced-density metal core layer 14. Here in addition to adjusting the total area of the through-holes of each unit cell, the spacing between adjacent unit cells can be adjusted to achieve the desired average density reduction for the reduced-density metal core layer 14.

Figure 6B:
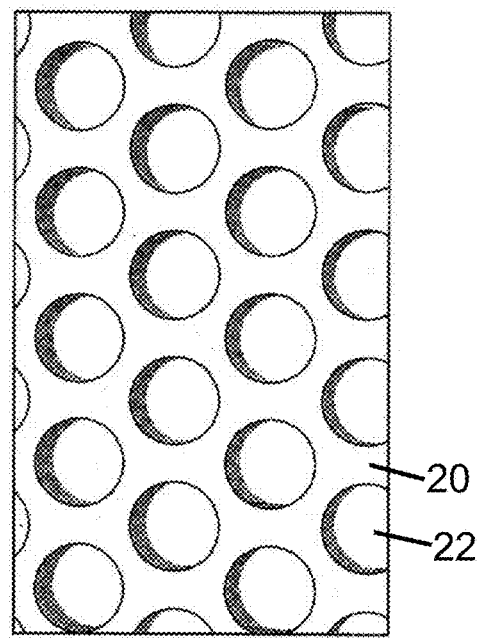
FIGS. 6A-6D show schematic top views of four different through-hole configurations for the reduced-density metal core layer of the laminate of FIGS. 1, 2, and 5.
Figure 6D:
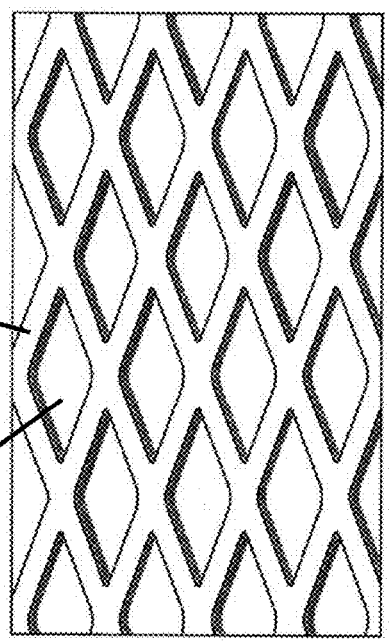
Figure 6A:
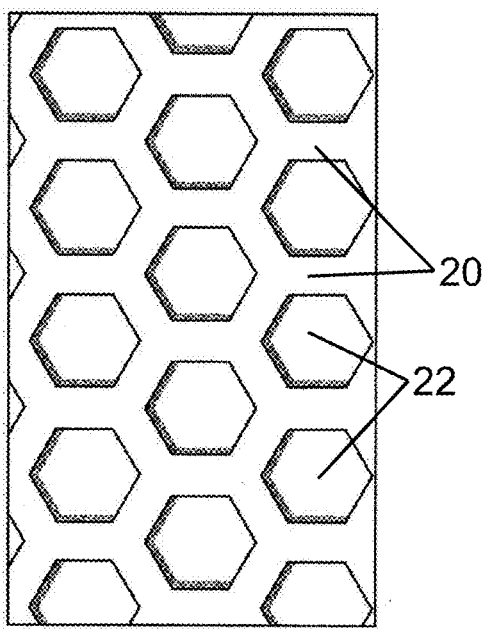
Figure 6C:
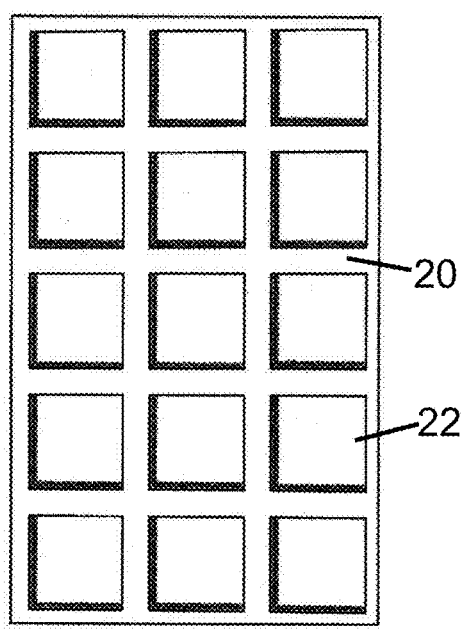
Figure 11:
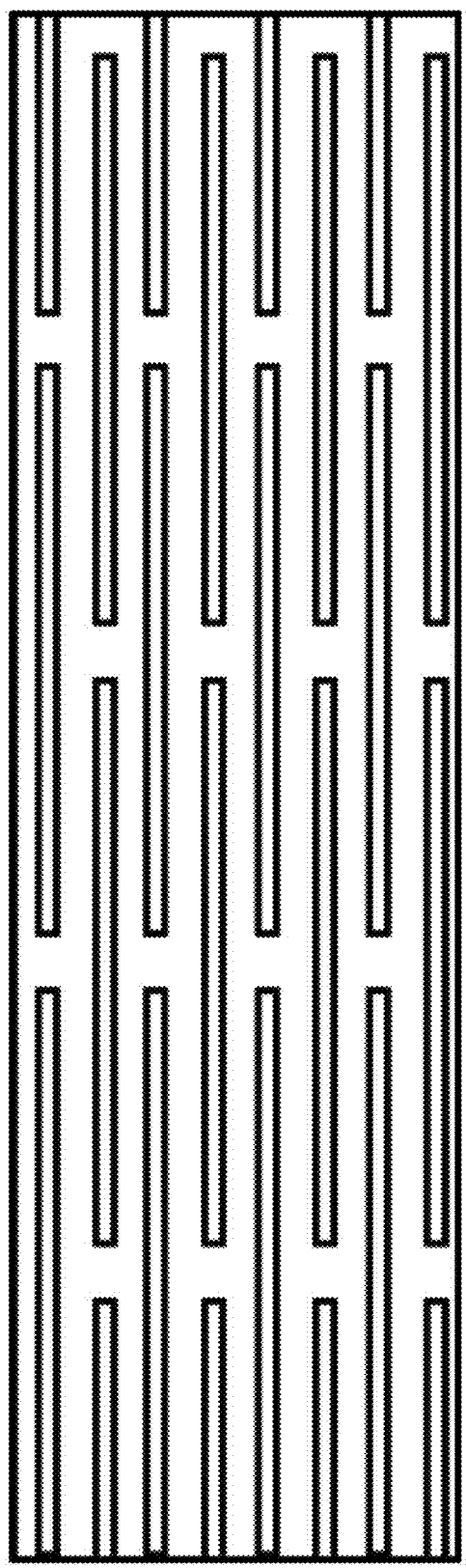
FIG. 11 shows a top view of another illustrative reduced-density metal core layer in which density-reducing openings comprise through-slits oriented to provide anisotropic properties for the metal laminate structure.

With reference to FIG. 11, in an extension of this approach, an asymmetric pattern of through-holes (e.g. through-holes of asymmetric cross-section with the long cross-section directions of the through-holes arranged in a generally aligned pattern, and/or through-holes whose spacing along one direction is smaller than along the transverse direction) may be employed to optimize the properties in one direction of the composite laminate 10, while keeping the overall mass to a desired light weight value. Illustrative FIG. 11 employs elongated through-holes (i.e. through-slots) all oriented in the same direction. Another example of such an anisotropic through-hole pattern, with a lower degree of anisotropy, is shown in FIG. 6D. This approach allows certain material properties of the laminate 10 to be maximized in one direction, while keeping the overall open area at a target value to achieve the desired laminate weight. For example, the anisotropic through-slots of FIG. 11 may provide advantageous anisotropic electrical or thermal sheet conductivity, anisotropic mechanical properties, or so forth.

TABLE 1

Tested Sample Laminate Structures

| | Skin Strips | | Core Layer | | | Bonded |
|---|---|---|---|---|---|---|
| Example No. | Material Composition | Thickness (mm) | Material Composition | % Open Area | Core Pattern | Thickness (mm) |
| 1 | 304 SS | 0.062 | Al 1100 | 62% | Diamond | 0.37 |
| 2 | 304 SS | 0.062 | Al 1100 | 67% | Diamond | 0.38 |
| 3 | 304 SS | 0.12 | Al 1100 | 62% | Diamond | 0.53 |
| 4 | 304 SS | 0.12 | Al 1100 | 67% | Diamond | 0.53 |
| 5 | 305 SS | 0.16 | Al 5052 | 50% | Circles | 0.90 |

With reference to Table 1, laminate samples were tested as to their mechanical properties. Coils (e.g. as in the laminate coil 100 of FIG. 5) were fabricated using stainless steel for the outer skin (sheet) layers and having various aluminum reduced-density metal core layers with both circular perforations (FIG. 6B) and diamond perforations (FIG. 6D) as listed in Table 1. The total bonded thickness varied from 0.37 to 0.90 mm and the percentage open area in the core ranged from 50% to 67%. Example No. 5 corresponds to the sample imaged in FIGS. 7 and 8.

The effective bending modulus for a sample of laminate 10 was characterized experimentally utilizing well-known beam bending equations which link the beam deflection at an applied load to the elastic modulus:

$$E = \frac{4Pl^3}{wt^3 \delta}$$

where P is a force applied at the distal end of a cantilevered beam, l is the beam length, w is the beam width, t is the beam thickness. The maximum deflection of the beam, denoted $\delta_{max}$, is given by:

$$\delta_{max} = \frac{Pl^3}{3EI}$$

where $$I = \frac{wt^3}{12}$$

Figure 12:
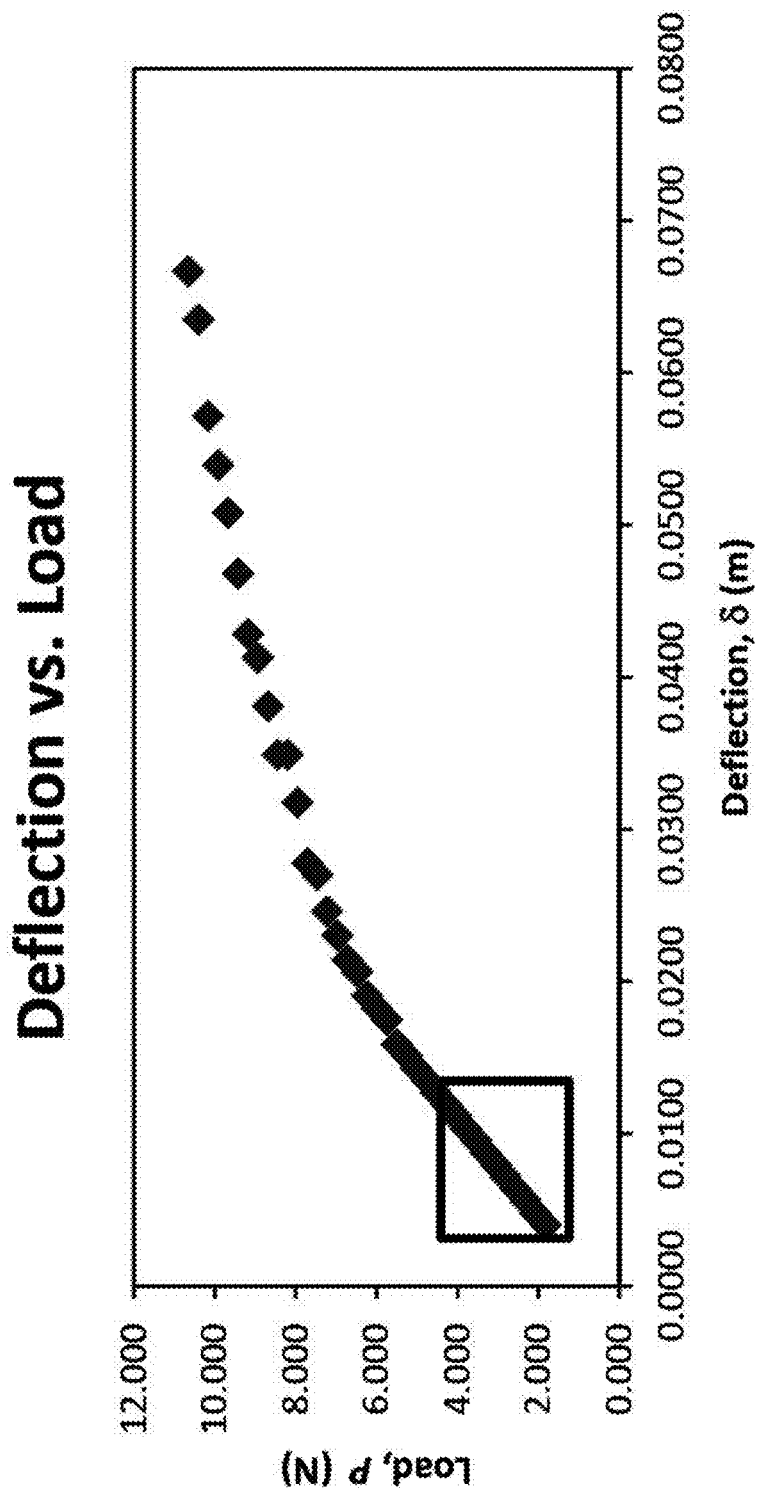
FIG. 12 presents a Load-Deflection Curve measured as described herein for the perforated core sample of FIGS. 1 and 2.

With reference to FIG. 12, an experimental Load-Deflection Curve is shown for the perforated core sample of FIGS. 1 and 2. By fitting a trend line to the linear elastic region indicated in FIG. 12, the effective bending modulus was calculated. That is, the linear portion of the Load-Deflection Curve was used to experimentally determine the flexural modulus, E. The effective bending modulus of the composite material of FIGS. 1 and 2 was found to be 151 GPa.

In bending, the stiffness of composite beam structures is heavily dominated by the stiffness of the materials on the top and bottom surfaces of the beams. This flexural modulus is defined as:

$$E_{Flexural} = \frac{1}{I_{Overall}} \sum_n (E_n \times I_n)$$

where $E_n$ is the elastic modulus of each layer, and $I_n$ is the moment of inertia for each layer. For a three-layer sandwich structure such as that of the laminate 10 of FIGS. 1 and 2, the moments of inertia for the skin layers ($I_s$) and core ($I_c$) are $$I_s = \frac{b}{12}(t^3 - t_c^3) \text{ and } I_c = \frac{bt_c^3}{12}$$

where $t_c$ is the thickness of the core material, t is the overall composite thickness, and b is the width of the beam. However, for a perforated core, the effective width of the core $b_c$ can be modeled as being reduced by a factor (1−f) to yield:

$$b_c = (1-f)b$$

where f is the fraction of the core material removed by perforations. Using these equations, predicted bending modulus values was compared with those experimentally determined from cantilever bend measurements as previously described. These results are presented in Table 2 for the Examples of Table 1.

TABLE 2

Bending Modulus results

| Example No | % Open Core | % Steel per Side | Bending Modulus, E (GPa) Meas/Calc |
|---|---|---|---|
| 1 | 62% | 15% | 141/146 |
| 2 | 67% | 15% | 135/137 |
| 3 | 62% | 24% | 179/172 |
| 4 | 67% | 24% | 174/172 |
| 5 | 50% | 18% | 151/154 |

Good agreement in measured and calculated flexural modulus values confirm that the laminate structure 10 including the reduced-density metal core layer 14 provides a stiff, lightweight and formable material.

For comparison of materials for use as stiff, lightweight beams, a common metric is used that was originally developed by Ashby. This metric compares materials by the metric $E^{1/2}/\rho$ where larger values correspond to superior performance as a stiff, lightweight beam. Table 3 compares measured values for the example composite materials of Table 1 with published values for common stamped and formed metals such as aluminum, steel and titanium.

TABLE 3

Ashby metric for Examples of Table 1 compared with literature values

| Material System | % Open Core | % Steel per Side | Modulus, E (GPa) | Density, ρ (g/cm³) | $E^{1/2}/\rho$ |
|---|---|---|---|---|---|
| Example 2 | 67% | 15% | 135 | 3.38 | 3.44 |
| Example 5 | 50% | 18% | 151 | 3.7 | 3.32 |
| Example 1 | 62% | 15% | 141 | 3.7 | 3.21 |
| Aluminum | | | 69 | 2.7 | 3.08 |
| Example 4 | 67% | 24% | 174 | 4.55 | 2.90 |
| Example 3 | 62% | 24% | 179 | 4.7 | 2.85 |
| Titanium | | | 116 | 4.5 | 2.39 |
| Stainless Steel | | | 193 | 8 | 1.74 |

As demonstrated by the $E^{1/2}/\rho$ values presented in Table 3, the laminate 10 of FIGS. 1 and 2 is able to provide superior performance as a light weight bending material compared to conventional metals. Moreover, manufacturing of the composite laminate 10 is economical, using roll-to-roll processing with the resulting laminate being compatible with conventional metalworking such as stamping and forming due to the strong metallurgical bonds.

The actually fabricated samples of Table 1 comprise steel continuous metal sheets bonded over a perforated aluminum core layer. Features of the actually fabricated laminate material include reduced weight (e.g., nominally 60% lighter than steel), increased stiffness (e.g., nominally two times stiffer than aluminum), and being fully formable in high volume stamping processes.

While steel/aluminum structures have been fabricated as test samples, the disclosed approach is more generally applicable to other metal combinations. Table 4 lists some other contemplated laminate structures. Table 4 is to be understood as a non-limiting list of some suitable metal combinations for the laminate 10, and it is to be understood that the laminate 10 may comprise other metal combinations.

TABLE 4

Some suitable materials for the laminate structure

| Skin/Core Metals | Core Porosity | Skin Thickness | Bending Modulus, E (GPa) | Density, ρ (g/cm³) | $E^{1/2}/\rho$ |
|---|---|---|---|---|---|
| Aluminum/Aluminum | 60% | 20% | 60 | 1.73 | 4.48 |
| Steel/Steel | 70% | 10% | 122 | 3.52 | 3.14 |
| Steel/Aluminum | 85% | 5% | 59 | 1.16 | 6.62 |
| Titanium/Aluminum | 60% | 10% | 71 | 1.77 | 4.76 |

For each material combination, various alloys and materials tempers are available. For instance, the Aluminum/Aluminum composite of Table 4 may be constructed from grades such as 2024, 3003, 6061 or 7075. For heat treatable aluminum grades, precipitation hardening treatments can be included after stamping and forming to increase the strength. Various combinations of metals may be used to achieve specific properties for the laminate 10. For example, the Steel/Steel combination of Table 4 may be used to achieve high temperature stability while also reducing component weight.

In the foregoing examples, the composite laminate structure 10 was employed, which includes three layers: the single reduced-density metal core layer 14; and the two cladding continuous metal sheets 12, 16. However, in order to separate the outer steel skins as far as possible while maintaining a core of very low density, it may be beneficial to layer multiple reduced-density metal core layers. Employing a stack of two or more reduced-density metal core layers facilitates keeping the size of the through-holes of each layer small, while keeping the total core thick. There is a correlation between the accessible perforation dimension and the thickness—generally the perforation size (e.g., measured as the diameter of through-holes of circular cross-section, or as the largest diameter of through-holes with hexagonal cross-section) should be at least 1-2 times the thickness of the core layer, and preferably even larger. But as explained with reference to FIGS. 7 and 8, through-holes of large size can lead to formation of dimples on the surface of the laminate, which can be undesirable for some applications. By contrast, a stack of two or more reduced-density metal core layers with thinner individual gauges would enable small perforations and large fractions of open area while keeping a thick core.

Figure 13:
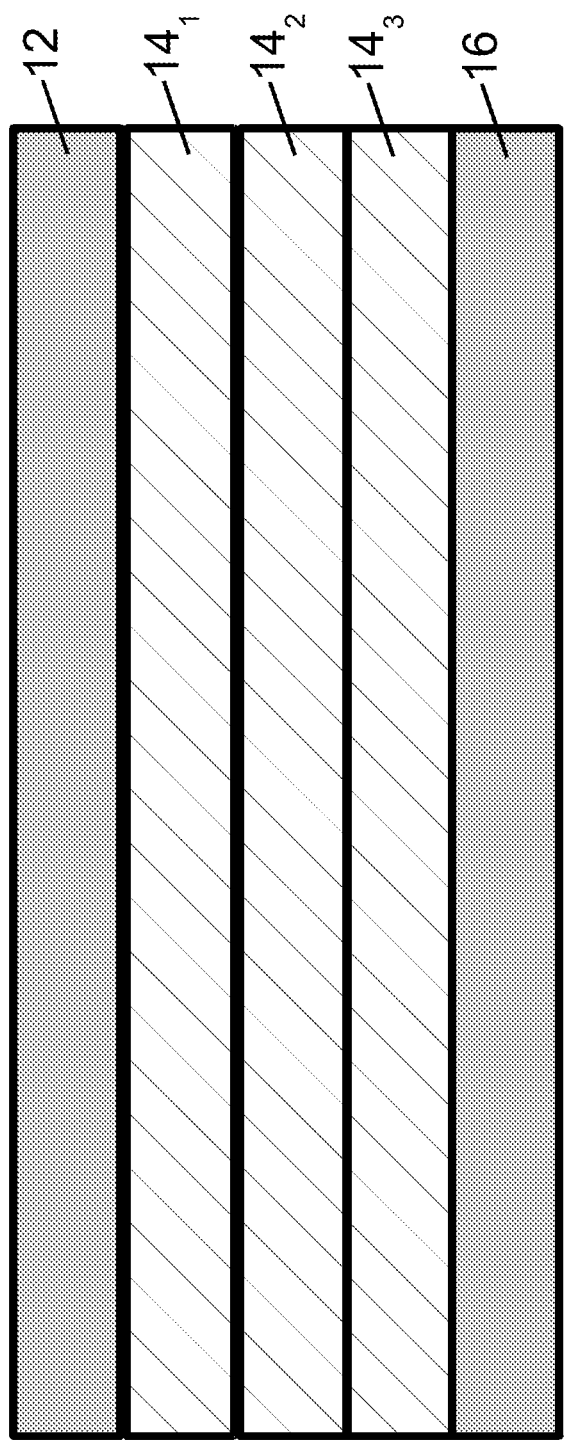

With reference to FIG. 13, a laminate is similar to the laminate 10 of FIGS. 1 and 2 and includes the cladding continuous metal sheets 12, 16; however, the single reduced-density metal core layer 14 of the embodiment of FIGS. 1 and 2 is replaced in the embodiment of FIG. 13 by a stack of three reduced-density metal core layers $14_1$, $14_2$, $14_3$. This three-layer core configuration enables wider separation of the high strength continuous clad sheets 12, 16, which maintains a large bending stiffness while (further) reducing density for this separation. The stack of three reduced-density metal core layers $14_1$, $14_2$, $14_3$ also enables smaller pore sizes relative to the overall core thickness. It will be appreciated that in such a multi-core layer design, the number of reduced-density metal core layers in the stack of three reduced-density metal core layers can be other than the illustrative three layers (e.g. may be two layers, three layers, four layers, et cetera. Providing a finer pore geometry in such a stack also helps to keep surfaces flat.

The laminate of FIG. 13 may be fabricated using the same low reduction bonding process as previously described with reference to FIG. 4, except that additional source sheet rolls may be needed. To achieve multiple layer bonding, two or more passes through the rollers may be utilized to build up the larger stack of layers of FIG. 13. (Indeed, even in the three-layer laminate 10 of FIGS. 1 and 2, it is contemplated to employ two passes, e.g. one to form the metallurgical bond between layers 12, 14 and a second pass to form the metallurgical bond between layers 14, 16). By performing surface activation (whether by removal of the native oxide or overcoating) for each surface joining another layer (that is, activating the surface of the continuous clad layer 12 which contacts the reduced-density metal core layer $14_1$, and activating both surfaces of the reduced-density metal core layer $14_1$, and activating both surfaces of the reduced-density metal core layer $14_2$, and activating both surfaces of the reduced-density metal core layer $14_3$, and activating the surface of the continuous clad layer 16 which contacts the reduced-density metal core layer $14_3$) a strong planar metallurgical bond is formed at each of the interfaces (that is between layers 12 and $14_1$, and between layers $14_1$ and $14_2$, and between layers $14_2$ and $14_3$, and between layers $14_3$ and 16).

With reference to FIG. 14, another advantage of employing a stack of reduced-density metal core layers is that the different layers of the stack may be made of different materials. For example, the illustrative laminate of FIG. 14 includes a stack of three reduced-density metal core layers, in which the outer two reduced-density metal core layers $14_{outer}$ are made of one metal and have a common through-hole geometry, and the inner reduced-density metal core layer $14_{inner}$ is made of a different metal and/or has a different through-hole geometry as compared with the outer layers $14_{outer}$. For example, the middle core $14_{inner}$ may be optimized for the lowest density while the outer core layers $14_{outer}$ are optimized to provide a desired imprint pattern on the surface of the laminate (using the same mechanism as previously described with reference to FIGS. 7 and 8). The desired pattern could be a logo, image or a visually appealing surface finish. Multiple layers could also be utilized to tailor the properties of the strip with different stiffness and/or density properties in each layer.

The metal laminate can be used for diverse applications currently using stamped metals in aerospace, automotive and consumer goods applications. Particular applications can include light weight structural panels, electrical conduit lines, bumpers or fenders, electronic enclosures, and the like. Other uses of the composite laminate will readily occur to those skilled in the art. The natural flame-retardant properties of the metal laminate and the temperature stability of the metallurgical interface between the core and the skin materials are especially advantageous properties for the aerospace and automotive industries.

The disclosure has been described with respect to preferred implementations. Modifications and alterations will occur to others upon a reading and understanding of this specification. It is our intention to include all such modifications and alterations insofar as they come within the scope of the appended claims or the equivalence thereof.

The invention claimed is:

1. A device comprising a component that is made from a metal laminate, the metal laminate comprising:
   a first continuous metal sheet;
   a second continuous metal sheet;
   a reduced density metal core layer disposed between the first continuous metal sheet and the second continuous metal sheet, the reduced density metal core layer comprising a continuous metal matrix formed from a core metal and having an average density that is less than the density of the core metal; and
   a planar metallurgical bond securing the first continuous metal sheet to the reduced density metal core layer; and
   a planar metallurgical bond securing the second continuous metal sheet to the reduced density metal core layer.

2. The device of claim 1, wherein the core metal is aluminum, copper, titanium, stainless steel, carbon steel, or an alloy thereof.

3. The device of claim 1, wherein:
   the first continuous metal sheet comprises aluminum, copper, titanium, carbon steel, stainless steel, or an alloy thereof; and
   the second continuous metal sheet comprises aluminum, copper, titanium, carbon steel, stainless steel, or an alloy thereof.

4. The device of claim 1, wherein the core metal is aluminum, the first continuous metal sheet is a stainless steel, and the second continuous metal sheet is a stainless steel.

5. The device of claim 1, wherein the thickness of the reduced density metal core layer is at least 50% of the total thickness of the metal laminate.

6. The device of claim 1, wherein the average density of the reduced density metal core layer is between 10% and 75% of the density of the core metal.

7. The device of claim 1, wherein the reduced density metal core layer comprises a layer of the core metal having through-holes passing through the layer.

8. The device of claim 7, wherein the through-holes are asymmetric.

9. The device of claim 7, wherein the through-holes have a size that is at least as large as the thickness of the reduced density metal core layer.

10. The device of claim 7, wherein the reduced density metal core layer comprises one of (1) a layer of the core metal having through-holes passing through the layer, (2) a woven or welded wire mesh or screen of the core metal, and (3) a porous layer of the core metal.

11. The device of claim 1, wherein the reduced density metal core layer comprises a stack of two or more reduced density metal core layers.

12. The device of claim 11, wherein the stack of two or more reduced density metal core layers comprise reduced density metal core layers with different geometries of through-holes, woven or welded meshes or screens, or porosities.

13. The device of claim 11, wherein the stack of two or more reduced density metal core layers comprise reduced density metal core layers of different core metals.

14. The device of claim 1, wherein the planar metallurgical bonds do not include a brazing or soldering material.

15. The device of claim 1, wherein:
the planar metallurgical bond securing the first continuous metal sheet to the reduced density metal core layer does not include a native oxide layer of a surface of the first continuous metal sheet and does not include a native oxide layer of a surface of the reduced density metal core layer; and
the planar metallurgical bond securing the second continuous metal sheet to the reduced density metal core layer does not include a native oxide layer of a surface of the second continuous metal sheet and does not include a native oxide layer of a surface of the reduced density metal core layer.

16. The device of claim 1, wherein:
the planar metallurgical bond securing the first continuous metal sheet to the reduced density metal core layer is formed by a process including (1) removing or overcoating a native oxide layer on a surface of the first continuous metal sheet and removing or overcoating a native oxide layer on a surface of the reduced density metal core layer and (2) press rolling the first continuous metal sheet and the reduced density metal core layer; and
the planar metallurgical bond securing the second continuous metal sheet to the reduced density metal core layer is formed by a process including (1) removing or overcoating a native oxide layer on a surface of the second continuous metal sheet and removing or overcoating a native oxide layer on a surface of the reduced density metal core layer and (2) press rolling the second continuous metal sheet and the reduced density metal core layer.

17. The device of claim 16, wherein the press rolling the first continuous metal sheet and the reduced density metal core layer and the press rolling the second continuous metal sheet and the reduced density metal core layer is performed simultaneously as a press rolling the first continuous metal sheet and the reduced density metal core layer and the second continuous metal sheet with the reduced density metal core layer sandwiched between the first and second continuous metal sheets.

18. The device of claim 1, including a pattern formed on an outer surface of the laminate that is embossed or imprinted from a pattern of through-holes of the reduced density metal core layer.

19. A device component that is made from a metal laminate, the metal laminate comprising:
a first continuous metal sheet;
a second continuous metal sheet;
a reduced density metal core layer disposed between the first continuous metal sheet and the second continuous metal sheet, the reduced density metal core layer comprising a continuous metal matrix formed from a core metal and having an average density that is less than the density of the core metal; and
a planar metallurgical bond securing the first continuous metal sheet to the reduced density metal core layer; and
a planar metallurgical bond securing the second continuous metal sheet to the reduced density metal core layer.

20. The device component of claim 19, wherein the device component is a structural panel, an electrical conduit line, an automotive bumper or fender, an electronic enclosure, or a device housing.

21. A device comprising a component that is made from a metal laminate, the metal laminate comprising:
a first continuous metal sheet;
a second continuous metal sheet;
a reduced density metal core layer disposed between the first continuous metal sheet and the second continuous metal sheet, the reduced density metal core layer comprising a core metal in the form of a continuous metal matrix surrounding through-holes, and having an average density that is less than the density of the core metal; and
a planar metallurgical bond securing the first continuous metal sheet to the reduced density metal core layer; and
a planar metallurgical bond securing the second continuous metal sheet to the reduced density metal core layer.

* * * * *